United States Patent [19]

Alkema et al.

[11] Patent Number: 5,268,714
[45] Date of Patent: Dec. 7, 1993

[54] MICROFICHE TO MICROFILM REFORMATTER, MICROFICHE COPIER, PROCESS OF REFORMATTING MICROFICHE TO MICROFILM, AND PROCESS OF COPYING MICROFICHE

[76] Inventors: Robert D. Alkema, 2475 Indian Creek Rd.; John P. Van der Kruik, 22802 Mountain Laurel Way, both of Diamond Bar, Calif. 91765; Herbert W. Ogden, 13096 Le Parc #87, Chino Hills, Calif. 91709

[21] Appl. No.: 879,305

[22] Filed: May 7, 1992

[51] Int. Cl.5 .............. G03B 27/44; G03B 27/32; G03B 27/52
[52] U.S. Cl. .............................. 355/54; 355/64
[58] Field of Search .............. 355/53, 54, 39, 64, 355/65, 50, 51

[56] References Cited

U.S. PATENT DOCUMENTS

| | | | |
|---|---|---|---|
| 3,784,303 | 1/1974 | Sullivan, Jr. et al. | 355/54 |
| 3,907,426 | 9/1975 | Goodliffe | 355/54 |
| 4,080,065 | 3/1978 | Spence-Bate | 355/54 |
| 4,094,603 | 6/1978 | Evers | 355/64 |
| 4,148,582 | 4/1979 | DeRyke et al. | 355/64 |
| 4,174,174 | 11/1979 | Hunter, Jr. et al. | 355/64 |
| 4,619,525 | 10/1986 | Schaut et al. | 355/64 |
| 4,655,583 | 4/1987 | Kitai et al. | 355/64 |
| 4,757,353 | 7/1988 | Kitai et al. | 355/64 |
| 4,777,514 | 10/1988 | Theer et al. | 355/64 |
| 4,777,515 | 10/1988 | Aikoh et al. | 355/64 |
| 4,783,685 | 11/1988 | Kahle | 355/45 |
| 4,783,686 | 11/1988 | Ishii et al. | 355/64 |
| 4,803,505 | 2/1989 | Saijo et al. | 355/64 |

*Primary Examiner*—Richard A. Wintercorn
*Attorney, Agent, or Firm*—William L. Klima

[57] ABSTRACT

An apparatus for reformatting microfiche to microfilm, paper, films or other substrates, and methods of reformatting microfiche into microfilm, paper films, or other substrates.

17 Claims, 9 Drawing Sheets

MICROFICHE TO MICROFILM REFORMATTER, MICROFICHE COPIER, PROCESS OF REFORMATTING MICROFICHE TO MICROFILM, AND PROCESS OF COPYING MICROFICHE

BACKGROUND OF THE INVENTION

1. Field of the Invention

The present invention is directed to an apparatus for reformatting microfiche to microfilm, an apparatus for copying microfiche, a method of reformatting microfiche to microfilm; and a method of copying microfiche onto a substrate.

2. Prior Art

The use of microfilm and microfiche to preserve records, particularly paper documents such as financial papers, negotiable instruments including personal and business checks, is a routine practice in the banking industry and other areas where high volumes of documents need to be preserved. Other areas of high use include archiving books and documents in library systems, preserving legal documents in courts and law firms, storing business records in corporations, storing blueprints, etc.

An industry has grown in the reproduction of copies from microfilm and microfiche to provide working hard copies for various uses. For example, in the legal field involving litigations, numerous paper copies and sets of copies of originals are required for submission as evidence in various proceedings ranging from doctor and hospital health care records in personal injury cases to corporate business, production, and research records in patent cases.

In the past, paper copies from microfilm could be printed directly from microfilm a page at a time with conventional microfilm copiers known as "reader/printers", however, this is a relatively slow and labor intensive process.

More desirably for high speed reproduction, paper copies can be continuously reproduced from microfilm, for example, with the copy-flow apparatus described in U.S. Pat. No. 4,912,517 by inventors Bob Alkema and John VanderKruik, incorporated herein by reference, developed by some of the same inventors as in the present invention. Micro 50 Incorporated (215 South Lemon Creek Drive, Walnut, Calif. 91789, Tel. No. 714/598-0027) manufactures and operates models known as MICRO-MPRs that are based on the technology described and claimed in U.S. Pat. No. 4,912,517. A MICRO-MPR can continuously print copies from microfilm with the capabilities of:

1) magnifying images from 7× to 50×;
2) printing from 16 mm to 35 mm roll microfilm;
3) handling paper from 4" to 14⅞" wide;
4) printing on bond or rag paper up to 120 lb. lb. weight; and
5) printing up to 66 pages a minute.

In the case of microfiche, there exists a number of slow speed copiers that print a page at a time. To operate one of these copiers, a sheet of microfiche is loaded into the copier and a particular frame, a copy of which is desired, is selected and positioned at an exposure position. Then the exposure cycle is initiated to form a copy by a xerographic process using a latent image. This process is slow and labor intensive, and is not conducive to high speed copying.

The inventors are aware of a somewhat automated machine for reproducing copies from microfiche that automatically scans microfiche and sequentially copies a frame at a time. However, it is believed that this apparatus is limited to utilizing standard format microfiche cards. Further, the reproduction rate is slow since each frame is positioned sequentially at the exposure station and then exposed.

SUMMARY OF THE INVENTION

An object of the present invention is to provide an apparatus for reformatting microfiche to microfilm.

Another object of the present invention is to provide an apparatus for reformatting microfiche to microfilm, which apparatus transfers one or more images or frame images from the microfiche to microfilm.

A further object of the present invention is to provide an apparatus for reformatting microfiche to microfilm, which apparatus transfers a column of microfiche frame images to the microfilm.

A still further object of the present invention is to provide an apparatus for reformatting microfiche to microfilm, which apparatus transfers an image on microfiche to microfilm by developing the image onto the microfilm.

An even further object of the present invention is to provide an apparatus for reformatting microfiche to microfilm, which apparatus places microfiche and microfilm together to develop an image from the microfiche onto the microfilm.

An object of the present invention is to provide a microfiche copying apparatus for reformatting microfiche to microfilm and making copies from the microfilm onto a substrate.

Another object of the present invention is to provide a microfiche copying apparatus for reformatting microfiche to microfilm and subsequently making copies from the microfilm.

A further object of the present invention is to provide an apparatus for sequentially reformatting microfiche to microfilm and subsequently making copies from the microfilm.

An object of the present invention is to provide a process of reformatting microfiche to microfilm comprising the step of photographing one or more individual frames of microfiche onto microfilm.

An object of the present invention is to provide a process of copying microfiche comprising the steps of photographing microfiche onto microfilm, and copying the microfilm onto a substrate.

The present invention involves the following same or related inventions, including:

1) apparatus for reformatting microfiche to microfilm;
2) apparatus for copying microfiche;
3) process(es) for reformatting microfiche to microfilm; and
4) process(es) for coping microfiche.

The present invention provides a process and apparatus for high volume and high speed reformatting microfiche to microfilm, more specifically 16 mm roll microfilm. Further, the present invention involves reformatting microfiche to microfilm, and printing copies from the microfilm, particularly copies onto paper and film by a photographic process (e.g. xerography).

The process and apparatus according to the present invention lend themselves to high speed information retrieval and reproduction of microfiche into a format useable for practical purposes (i.e. in a format that can be read by the unaided eye).

Microfiche for purposes of the present invention include but are not limited to plastic cards or sheets (e.g. Mylar sheet) with one or more images placed or developed onto the card typically by a photographic size reduction process. Standard microfiche include 24×(number of times of reduction) having a matrix of frames defined by fourteen (14) columns and seven (7) rows, and 42×having 15 columns and 13 rows. However, the present invention can process a wide range of different format sizes and arrangement ranging from 19× to 52×.

It is possible that discrete lengths of microfilm having a plurality of frames could substitute for microfiche and be reformatted onto a roll of 16 mm microfilm according to the present invention. This could occur where discrete lengths of microfilm, for example each embodying a single multipage document are reformatted onto roll 16 mm microfilm for high speed copying. Thus, for purposes of this invention discrete lengths of microfilm (e.g. one (1) to twenty (20) frames) can be considered a microfiche substitutes.

The present invention allows for the reformatting of microfiche vesicular film, diazo film, silver film, and other commercially available films suitable for microfilm reproduction. Further, the invention allows for the reformatting of the microfiche in any direction, typically top to bottom or left to right depending on the original sequence of image development on the microfiche. The present invention is able to convert the following:
Positive fiche to negative film
Negative fiche to positive film
Positive fiche to positive film
Negative fiche to negative film Thus, the present invention is extremely versatile and can accept most types and formats of microfiche for reformatting onto 16 mm microfilm.

DETAILED DESCRIPTION OF PREFERRED EMBODIMENTS

Figure 1:
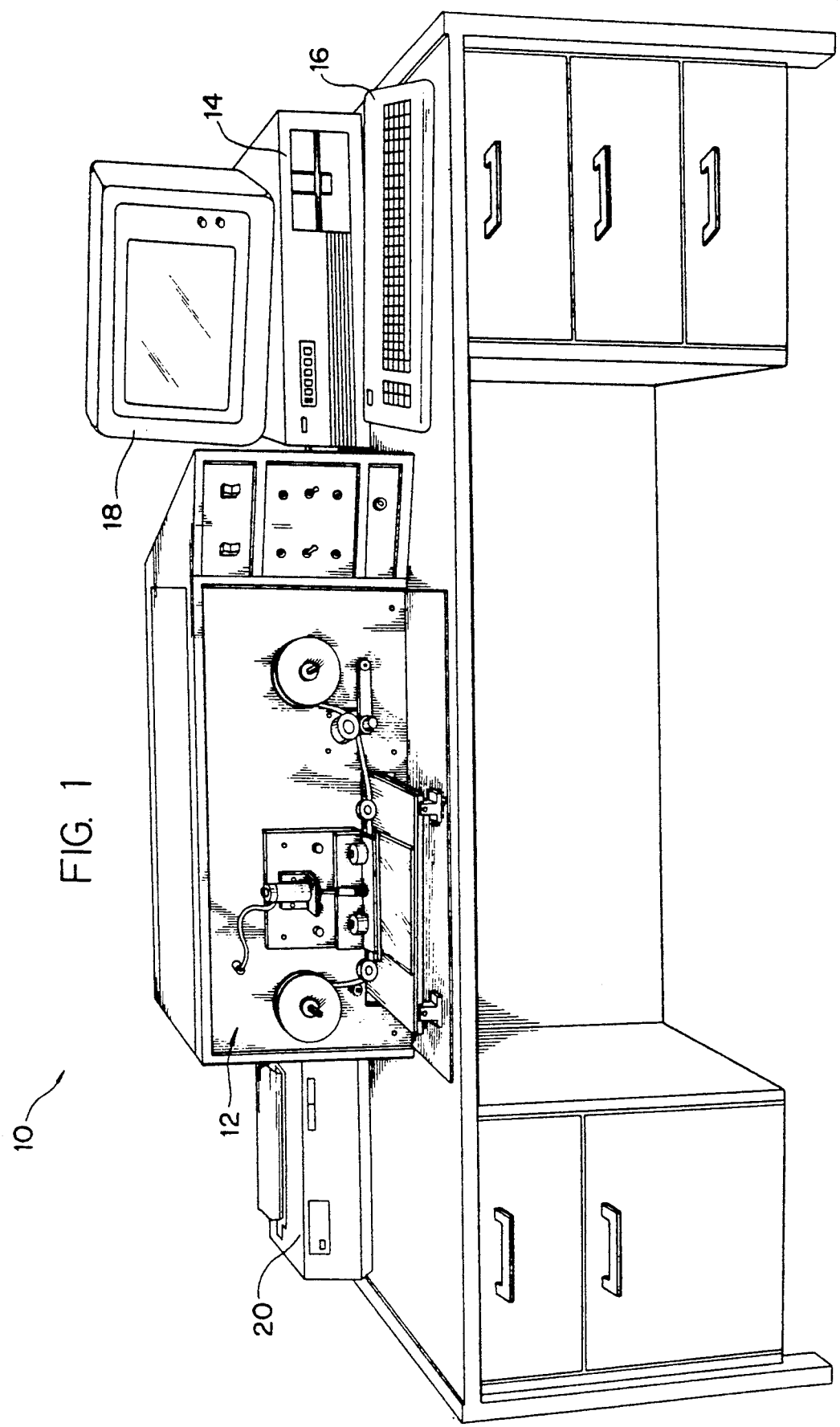
FIG. 1 is a perspective view of an embodiment of the reformatting apparatus according to the present invention.

A perspective view of an embodiment of the apparatus 10 according to the present invention is shown in FIG. 1. The apparatus 10 includes reformatting device 12, computer 14 including keyboard 16 and monitor 18, and printer 20. The reformatting device will be described in detail below. The computer 14 can be a personal computer such as a conventional IBM Model XT, IBM Model AT, 286, 386SX, 386 or 486 Intel microprocessor based computer.

The reformatting device 12 is provided with a front support plate 22 extending to a base plate 24. Alternatively, a frame arrangement or other type of support arrangement can be substituted for the plate support arrangement in the embodiment illustrated in the drawings.

Figure 2:
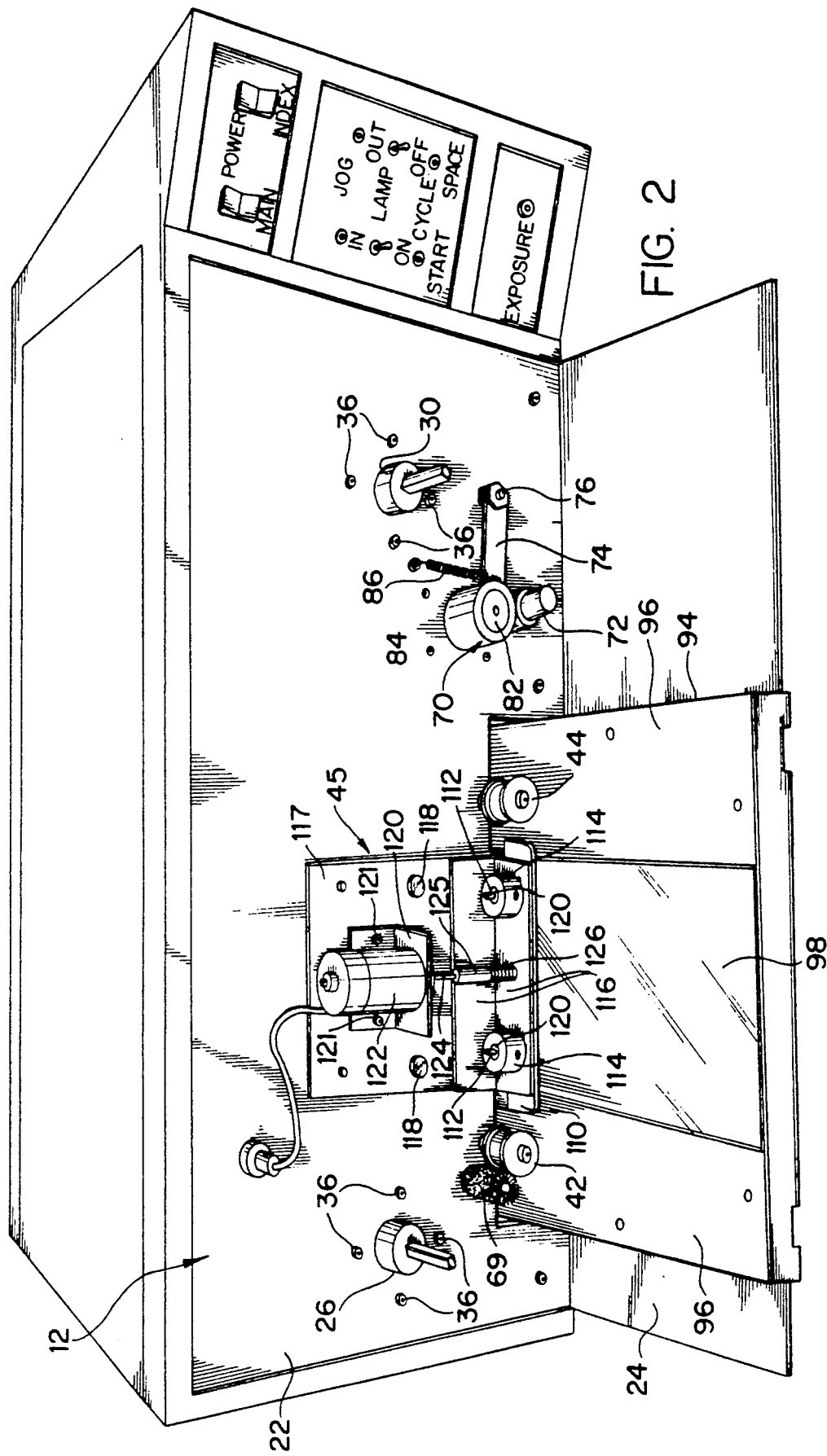
FIG. 2 is a more detailed perspective view of the reformatting device of the apparatus shown in FIG. 1.

The reformatting device 10 itself can be positioned on top of a work support such as a table, desk as shown in FIG. 1, or custom made work support. Further, the reformatting device can be attached, connected or integrated with the work support such as by mounting the base plate 24 into the top surface of the work support (e.g. desk) so that the top of the base plate is flush with the top of the work support, as shown in FIG. 2. Alternatively, the base plate can extend underneath the other components of the reformatting device 12 to serve as a support for all the components of the device making the reformatting device portable.

FILM ADVANCING ARRANGEMENT

Figure 3:
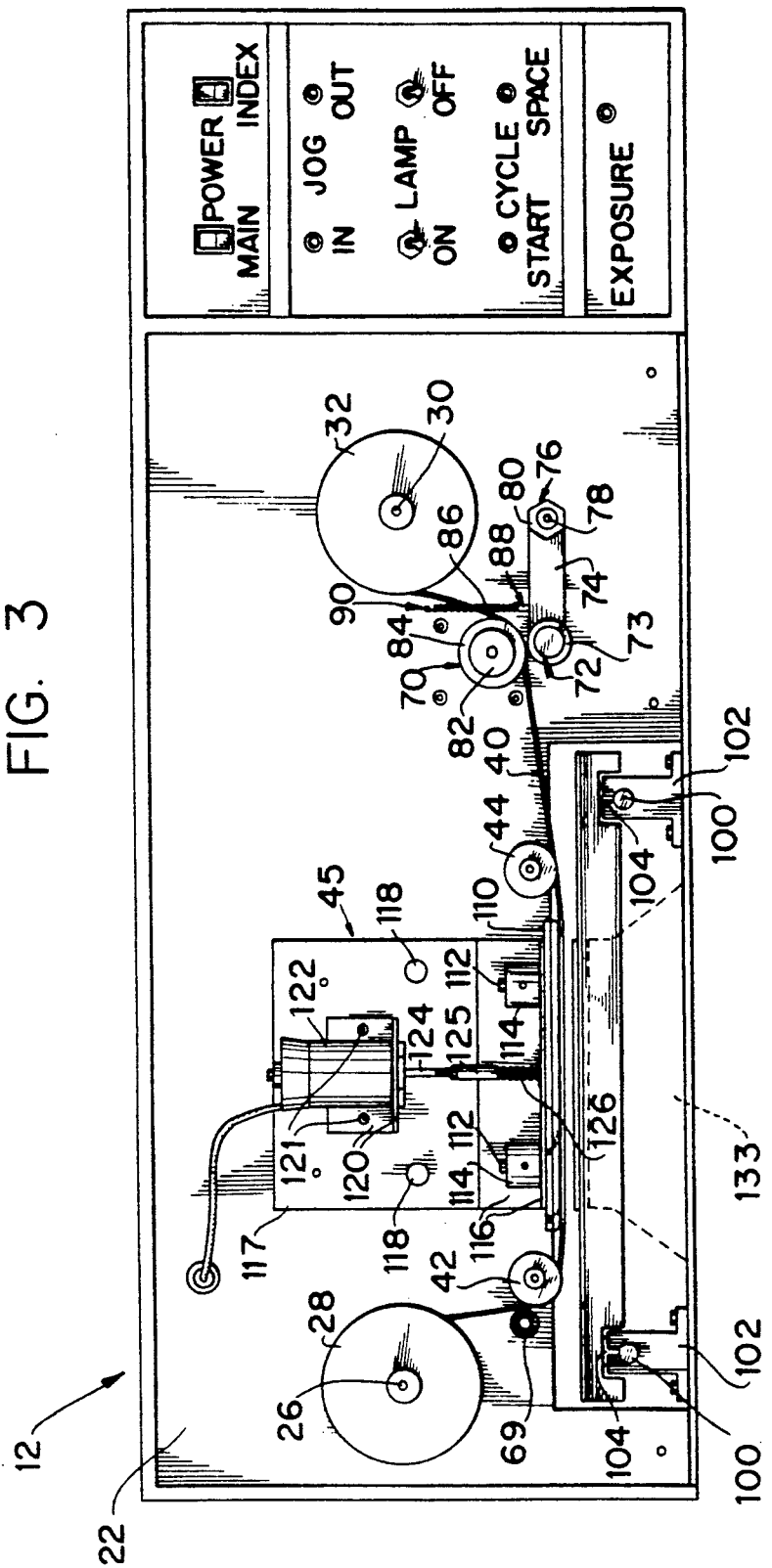
FIG. 3 is a front view of the reformatting device shown in FIG. 2.
Figure 4:
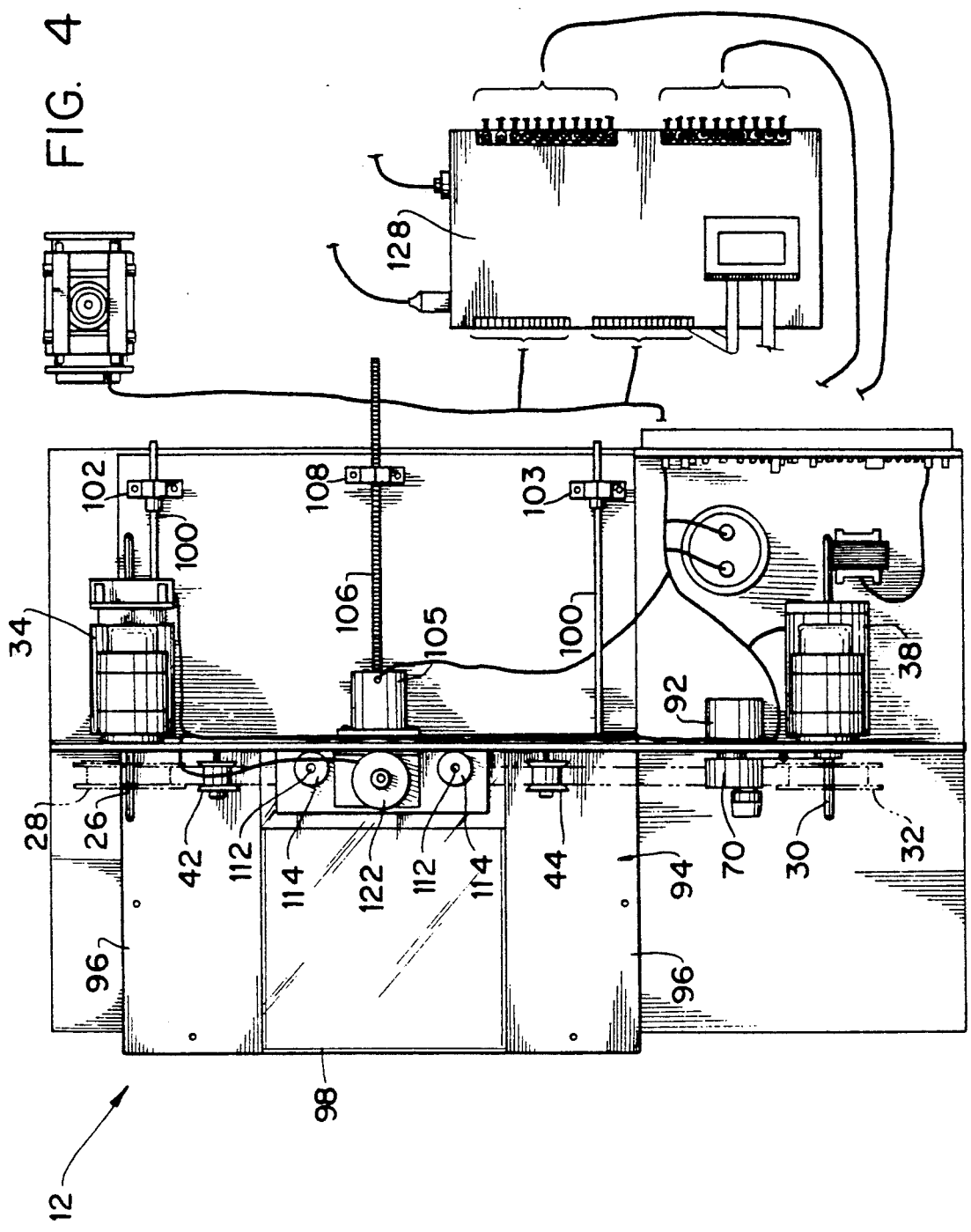
FIG. 4 is a top view of the reformatting device shown in FIG. 2 with the cover removed.

A spindle 26 for rotatably supporting a film supply reel 28 and a spindle 30 for rotatably supporting film take-up reel 32 are shown in FIGS. 2 and 3. The spindles 26 and 30 are rotatably supported on front side of support plate 22, and pass through a set of openings (not shown) in the support plate 22. More specifically, spindle 26 is connected to and driven by electric motor 34 provided with an electrically actuated brake (not shown), as shown in FIG. 4. The electric motor 34 is mounted to the back of support plate 22 by four (4) machine screws 36 positioned in drilled holes through the support plate (See FIG. 2). The machine screws 36 are received within threaded holes in the housing of the electric motor 34.

Similarly, spindle 30 is connected to and driven by electric motor 38 (without a brake), as shown in FIG. 4. The electric motor 38 is mounted to the back of support plate 22 by four (4) machine screws 36 positioned in drilled holes through the support plate. The machine screws are connected to threaded holes in the housing of the electric motor 38.

Suitable electric motors 34 and 38 for the reformatting apparatus 12 are manufactured by Motronics, Model 34205-13-300-03N. The electric motor 34 is provided with and electrically actuated brake for precisely starting an stopping the motor 34. More specifically, the amount of braking action on motor 34 can be controlled to effect no braking action, i.e. free wheeling, limited slip, i.e. variably controlled selected amount of resistance, and no slip, i.e. locking (until a sufficient threshold torque is applied that overrides and exceeds the braking specification for maximum braking power of the brake, which is undesirable and may damage the brake).

The electric motors 34 and 38 can be operated so that the microfilm is under constant tension to increase the precision and accuracy of the development of the microfiche image onto the microfilm during exposure. Specifically, the electric motor 34 can be driven in a direction opposite to the direction of rotation of film feeding to maintain tension on the film. The details of operation of the film feeding operation will be described in detail below.

Further, the electric motors 34 and 38 in combination with other film advancing means to be described below play an important role in precisely and accurately advancing the microfilm an increment at a time. Again, the electric motors 34 and 38 are controlled to provide a desired amount of tension on the microfilm.

The reformatting device 12 is provided with a film advancing and guiding arrangement. One film advancing arrangement is shown in the drawings and described in detail below. However, other suitable arrangements can be provided that incorporate other types of film advancing mechanisms such as stationary guides, driven and undriven roller arrangements, and other means for controlling the path of movement of the film through the device. The specific arrangement shown in the drawings and described below is particularly suitable for controlling the film movement and path through the device, and meets the requirements for proper operation of the device.

Figure 5:
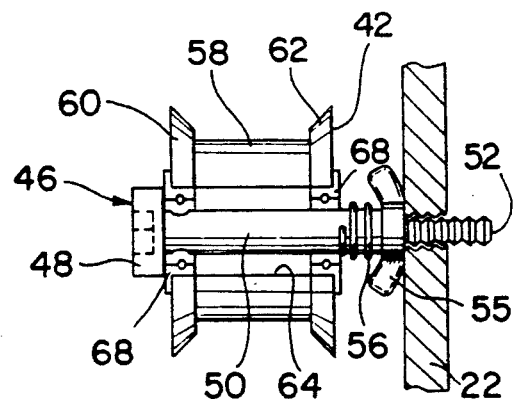
FIG. 5 is a detailed side cross-sectional view of a guide spool.

The reformatting device 12 is provided with guide spools 42 and 44 located on either side of film exposure station 45. A detailed side cross-sectional view of guide spool 42, is shown in FIGS. 5. Guide spool 44 is constructed in the same manner as guide spool 42.

Guide spool 42 is mounted for free rotation on axle 46. Axle 46 is defined by allen head 48, smoothed surfaced shaft 50, and threaded end 52. The threaded end 52 is received within a threaded hole 54 in support plate 22. The threaded end allows for a wing nut 55 or other fastener to be threaded on the end thereof for locking the axle 46 at a desired position after adjusting its position relative to support plate 22.

A coil spring 56 is mounted on the axle 46, and is positioned between the spool 42 and wing nut 55 for biasing the spool away from the support plate 22 against the allen head 48. The distance of the spool 42 relative to the support plate 22 can be varied for adjusting the lateral positioning of the film at the film exposure station 45. To adjust the positioning, the threaded end 52 of the axle 46 is screwed into and out of the threaded hole 54 in the support plate 22 against the bias and friction produced by the spring 56, for example, with an allen head wrench.

The guide spool 42 is defined by a roller portion 58 and end guides 60 and 62. The surface of the roller portion 58 rotates and contacts with the film, and bends the path of the film at its location on the support plate 22 to guide the film to the film exposure station 45. The end guides 60 and 62 maintain the film centered on the roller portion 58 of the guide spool 42.

The guide spool 42 is provided with a bore 64 for accommodating ball bearings 66 and 68 at either end of the guide spool 42. The ball bearings 66 and 68 rotatably support the guide spool 42 on the axle 46 for low friction rotation.

A static electricity grounding device 69 is provided adjacent guide roller 42 for contacting with the lower surface of the advancing microfilm to remove built up static electricity therefrom, as shown in FIG. 3. The static electricity is removed so that the microfilm doesn't adhere to the microfiche at the film exposure station 45.

The film is precisely and accurately advanced by the combination of driving roller 70 and backing roller 72. The backing roller 72 is provided with a roller blanket 73 for conforming with the advancing film. Further, the roller blanket 73 is rotatably mounted for free rotation at one end of pivot arm 74. The pivot arm 74 is pivotably mounted on the support plate 22 at pivot 76. The pivot 76 can be defined by an axle 78 mounted and extending cantilever from support plate 22 with the pivot arm 74 secured to the axle 78 by a nut 80. Other alternative pivot arrangements to pivotally mount arm 74 from the support plate 22 can be substituted for the one shown and described above.

The driving roller 70 can be embodied in a number of suitable arrangements. In the illustrated embodiment, the driving roller 70 is defined by a roller 82 and fitted with a roller blanket 84. The surface of the roller 82 can be knurled and/or provided with adhesive to prevent slippage between the roller 82 and roller blanket 84 to maintain the accuracy and precision of its film advancing capability.

The backing roller 72 is biased against film driving roller 70 to prevent any slippage between the driving roller and the advancing film. The backing roller 72 can be biased against the driving roller in a number of different arrangements. In the illustrated embodiment, a spring 86 can be provided for biasing the backing roller 72 against the driving roller 70. More specifically, the spring 86 can be attached to the pivot arm 74 at connection point 88 at one end, and attached to the support plate 22 at anchoring point 90. The connection points and orientation of the spring 86 are selected so that the spring constantly biases the pivot arm 74, and in effect biases the backing roller 72 against driving roller 70.

The driving roller 70 is connected to electric stepping motor 92 mounted to the opposite side of support plate 22, as shown in FIG. 4. The electric stepping motor 92 is controlled to advance the film in discrete lengths with very high accuracy and precision in timing with the film development operation to be described in detail below. The timing of the film with the exposure operation is an important feature of the present invention.

MICROFICHE POSITIONING ARRANGEMENT

The reformatting device is provide with a moveable stage 94 for supporting and moving the microfiche relative to the film exposure station 45. More specifically, the stage 94 is moveable in one direction back-and-forth along an axis perpendicular relative to the support plate 22 for positioning respective columns or rows of image frames of the microfiche being reformatted at the film exposure station 45. Accordingly, a column or row of image frames of the microfiche is exposed onto the microfilm at each exposure cycle by this work support arrangement.

The stage 94 can be a single plate or a constructed arrangement. For example, the stage 94 can be constructed of side plates 96, 96 connected to a glass plate 98 therebetween. A microfiche card being reformatted can be attached to the glass plate with adhesive tape, or by some other securing means.

The stage 94 is fitted with means for accurately and precisely moving and positioning the stage 94. A number of different arrangements can be used for performing such function. The illustrated embodiment includes a pair of guide rails 100 each mounted on a pair of front end supports 102, as shown in FIG. 3, and a pair of rear end supports 103, as shown in FIG. 4. The end supports 102 and 103 are anchored to the base of the reformatting device 12. A lower portion of the stage 94 is provided with linear guide ball bearings 104, which cooperate with the guide rails 100 for precisely maintaining the path of movement of the stage 94 during operation.

The preferred arrangement includes an electric stepping motor screw jack 105 mounted on the back of the moveable stage 94. The electric stepping motor screw jack 105 cooperates with a stationary fixed (non-rotating) screw shaft 106, which is connected at one end to support 108 and at an opposite end to another similar support (not shown). Both end supports of the screw shaft are secured to the base of the reformatting device. The screw shaft 106 passes through the armature of electric stepping motor screw jack 105. The passageway through the armature is provided with threads for cooperating with the threads of the screw shaft 106. As the armature is rotated, the threads of the armature advance on the threads of the threaded shaft 106 and move the motor 105 mounted on the moveable stage 94. This drive arrangement allows the stage 94 to be precisely and accurately moved back-and-forth. The direction of rotation (clockwise or counter-clockwise) and rotation rate of the electric stepping motor 105 is controlled, in a manner to be described in detail below, for moving the stage 94 in a preselected sequence to carry out the reformatting operation.

MOVEABLE PLATEN AT EXPOSURE STATION

The reformatting device 12 is fitted with a moveable platen 110, which can be moved upwardly to a stand-by position, and downwardly for pressing the microfilm into intimate contact with the microfiche during the film development operation. Other means can be provided for placing the microfiche and microfilm together, however, the following illustrated and described arrangement is particularly suitable for this function.

The platen 110 is provided with a pair of upwardly extending guide pins 112. The guide pins 112 are received within a corresponding pair of guides 114 supported on a L-shaped support 116. The L-shaped support 116 is mounted on a plate support 117, which in turn is mounted to the support plate 22 by threaded fasteners 118. This arrangement supports and guides the platen for movement upwardly and downwardly in the vertical direction.

L-shaped support 120 is attached to plate support 117 by fasteners 121. The L-shaped support 120 supports a solenoid actuator 122 used for biasing the platen 110 in the downward direction. The solenoid actuator 122 is connected to the platen 110 by shaft 124 provided with a stop 125. A spring 126 is mounted on the shaft 124 between the horizontal portion of the L-shaped support 117 and the stop 125 for biasing the platen 110 upwardly to the stand-by position. More specifically, when the solenoid actuator 122 is activated, shaft 124 is magnetically driven downwardly to actuate the platen 110 in a downward direction against the bias of spring 126. When the solenoid actuator is deactivated, the spring 126 biases the platen 110 upwardly.

ELECTRICAL COMPONENTS

Figure 6:
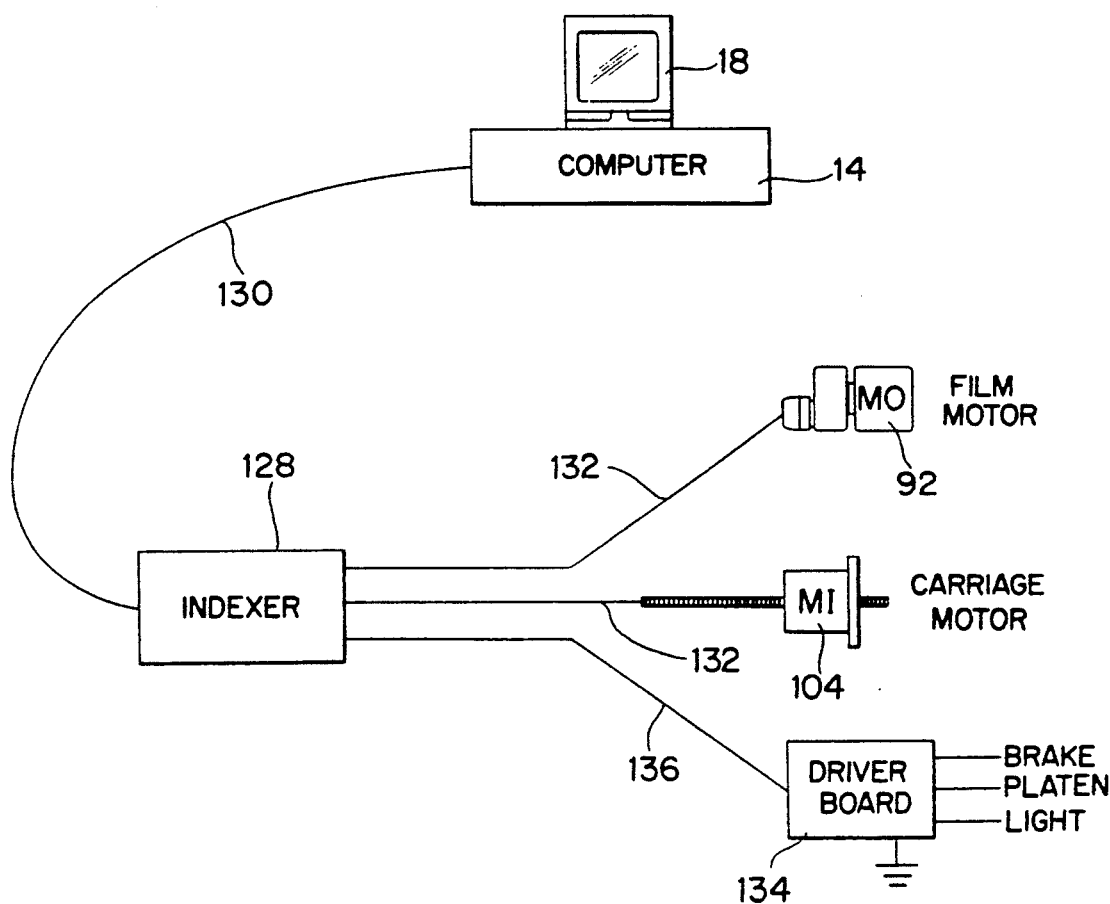
FIG. 6 is a schematic diagram of the motor drive and control arrangement for advancing the microfilm.

The computer 14 is electrically connected to a programmable preset indexer 128 by cable 130, as shown in FIG. 6. The indexer 128 is connected to an electrical stepping motor 92 via cable 130 for controlling film advancing. Further, the indexer 128 is connected to electrical stepping motor 105 via cable 132 for controlling the movement of the stage 94 for positioning the microfiche at the film exposure station 45. The indexer 128 is also connected to driver board 134 via cable 136 for controlling the brake of electric motor 34, the solenoid actuator for controlling the movement of platen 110, and light exposure operation.

An exposure lamp 133 is positioned beneath the glass plate of the moveable stage 94, as shown in FIG. 3. The exposure lamp is provided with one or more electrically controlled bulbs. The exposure lamp is preferably designed to provide a uniform exposure across the one or more frames of microfiche being exposed and developed onto the microfilm. For example, the bulbs are positioned close together at the ends of a bulb array while the bulbs in the center are spaced further apart to provide uniformity.

Figure 7:
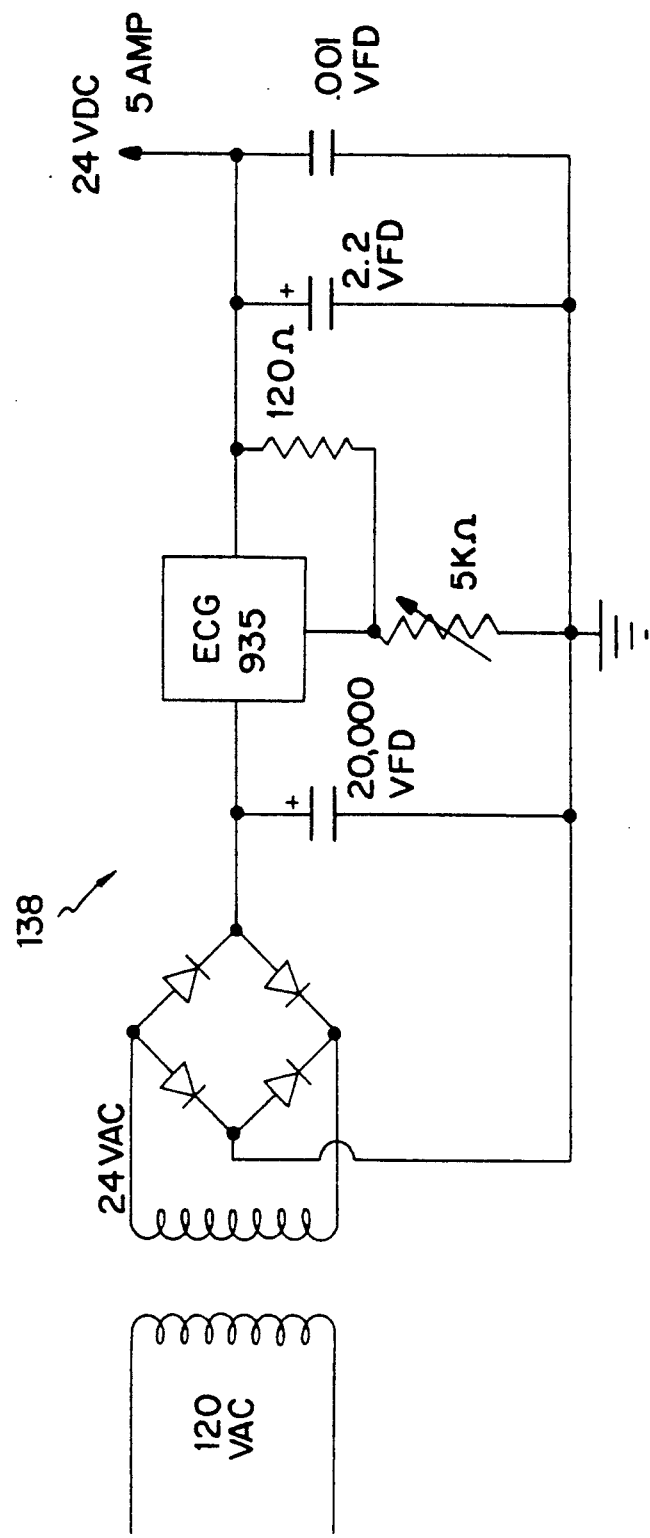
FIG. 7 is an electrical schematic diagram of the power supply circuit.
Figure 8:
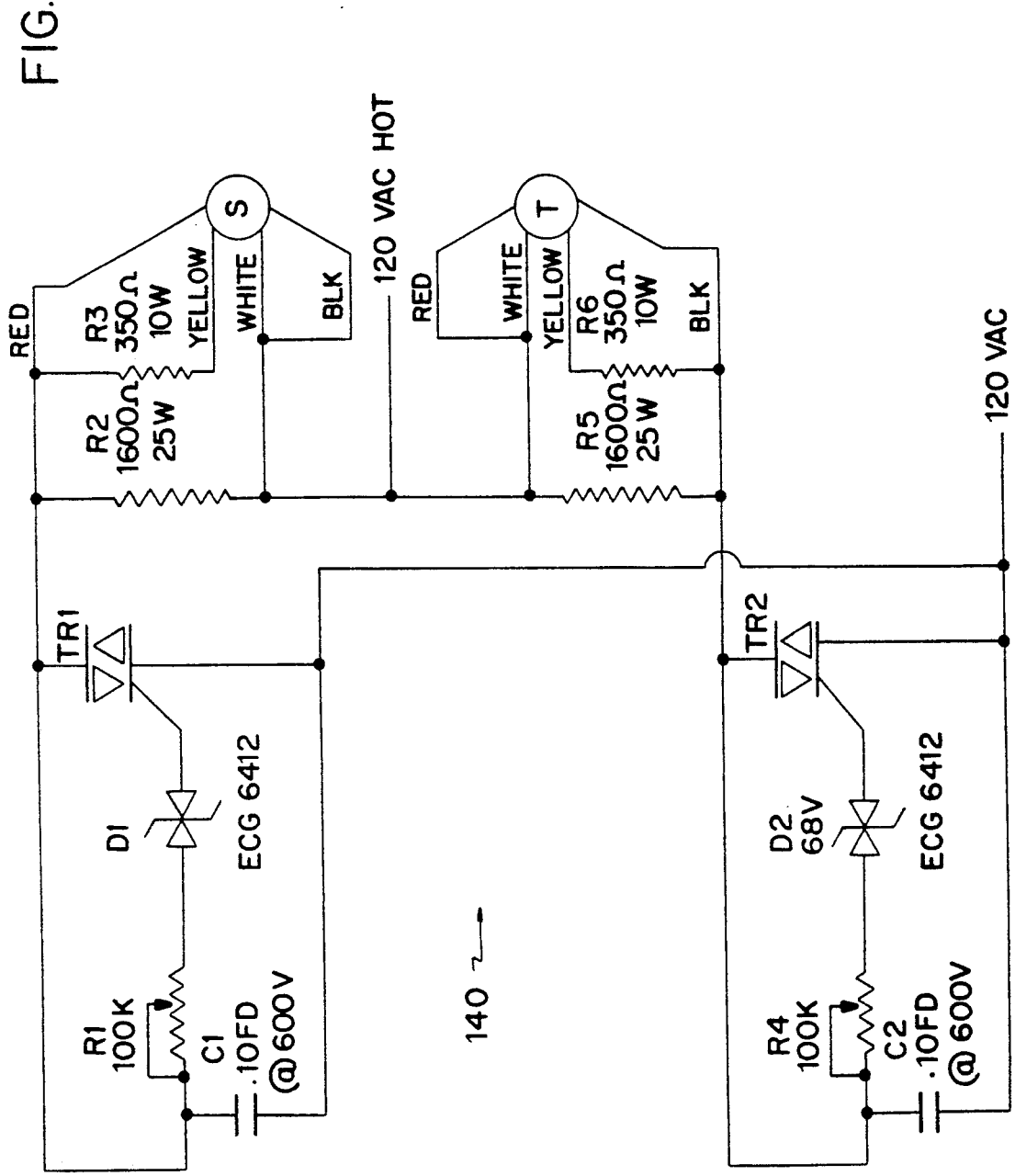
FIG. 8 is an electrical schematic diagram of the film tensioning board circuit.
Figure 9:
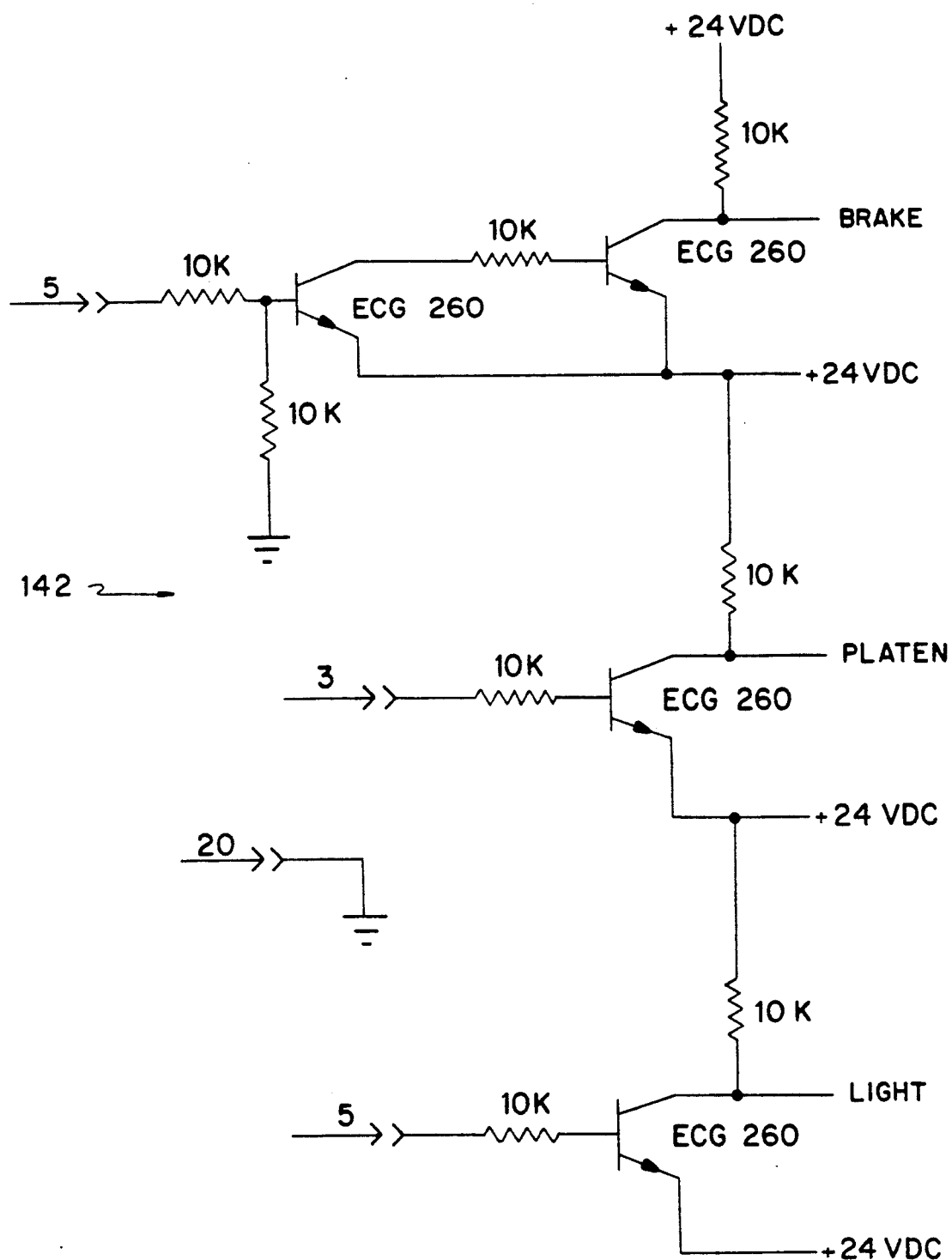
FIG. 9 is an electrical schematic diagram of the driver board circuit.
Figure 10:
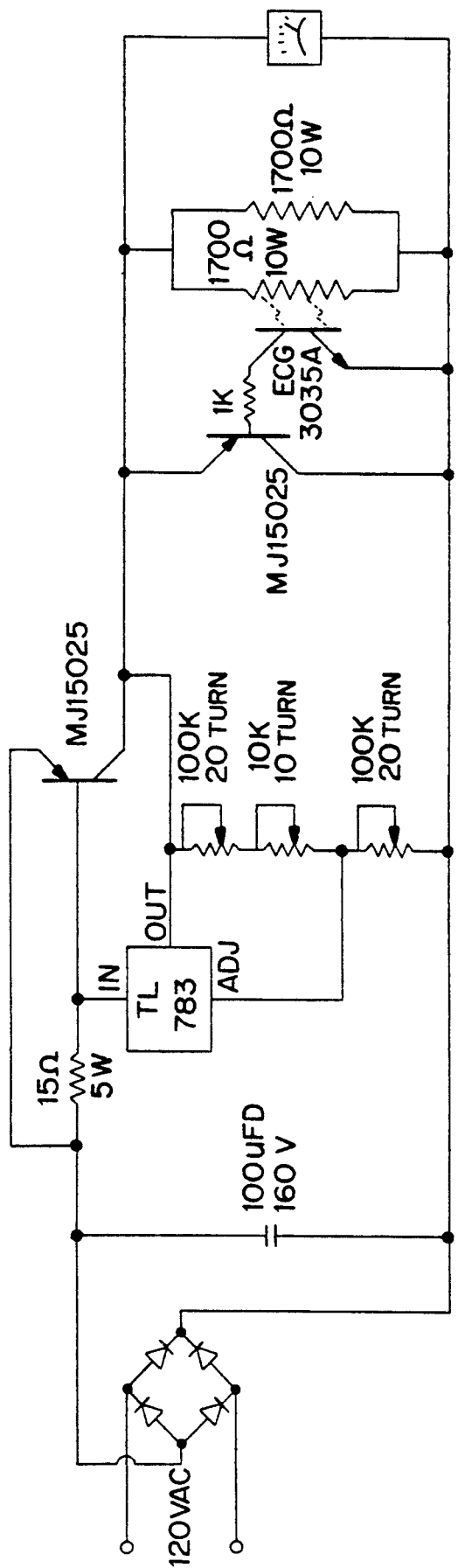
FIG. 10 is an electrical schematic diagram of the exposure lamp control circuit.

Details of the power supply circuit 138, film tensioning board circuit 140, driver board circuit 142 and exposure lamp control board circuit of the reformatting device 12, are shown respectively in FIGS. 7, 8, and 9.

OPERATION

The following is a description of the operation of the illustrated and above described embodiment of the apparatus and reformatting device according to the present invention.

Referring to FIG. 3, the operation of the apparatus begins by an operator turning on the main power switch, which turns on the power supply circuit 138, film tensioning circuit 140, driver board circuit 142, and the exposure lamp control circuit 144. The indexer power switch is turned on, which controls both the carriage drive and film advance. The indexer acts as an interface between the carriage drive, film advance and the computer.

The operator loads fresh reel of unexposed duplicating microfilm onto the spindle 26, and threads the film between the guiding spool 42 and static electricity removing device 69, along guiding spool 44, between driving roller 70 and backing roller 72, and onto take-up reel 32 mounted on spindle 30. A microfiche card is positioned onto the glass plate 98 of the moveable stage 94, and held in place with one or more pieces of tape.

The operator sets the exposure lamp to a predetermined voltage depending on the fiche image density. The start button is depressed to send a signal to the indexer to begin transfer of the fiche. The indexer uses two programs to accomplish the duplicating of the fiche. Program #0 is used to control axis #0 (film drive), and program #1 is used to control axis #1 (carriage drive).

The above programs are written on a conventional personal computer, and then down loaded to the indexer. By storing the information on the computer, this allows for a quick change of set-up required due to the many different formats, and types of fiche.

EXAMPLES

The following programs are for a standard 24×(14 columns by 7 rows) silver based fiche.

| PROGRAM #0 Stored program length is 93 bytes | | | | |
|---|---|---|---|---|
| 0 | 1 | Wait | 1 | 24X AXIS#0 |
| 2 | 2 | Acceleration | 5 | |
| 4 | 3 | Deceleration | 5 | |
| 6 | 4 | Base speed | 200 | |
| 8 | 5 | Max speed | 750 | |
| 11 | 6 | If | 16, 16, 6 | |
| 15 | 7 | Output | 1, 1 | |

PROGRAM #0
Stored program length is 93 bytes

| | | | |
|---|---|---|---|
| 18 | 8 | Wait | 7 |
| 20 | 9 | Output | 2, 2 |
| 23 | 10 | Wait | 20 |
| 25 | 11 | Output | 2, 0 |
| 28 | 12 | Wait | 8 |
| 30 | 13 | Output | 1, 0 |
| 33 | 14 | Number | 600 |
| 36 | 15 | + Plus | |
| 37 | 16 | Go | |
| 38 | 17 | Output | 16, 16 |
| 41 | 18 | Wait | 1 |
| 43 | 19 | Output | 16, 0 |
| 46 | 20 | If | 1, 1, 20 |
| 50 | 21 | If | 2, 0, 33 |
| 54 | 22 | Loop | 5, 7 |
| 57 | 23 | Output | 1, 1 |
| 60 | 24 | Wait | 7 |

PROGRAM #0
Stored program length is 93 bytes

| | | | |
|---|---|---|---|
| 62 | 25 | Output | 2, 2 |
| 65 | 26 | Wait | 20 |
| 67 | 27 | Output | 2, 0 |
| 70 | 28 | Wait | 8 |
| 72 | 29 | Output | 1, 0 |
| 75 | 30 | Number | 600 |
| 78 | 31 | + Plus | |
| 79 | 32 | Go | |
| 80 | 33 | Output | 8, 8 |
| 83 | 34 | If | 4, 4, 34 |
| 87 | 35 | Output | 8, 0 |
| 90 | 36 | Run | 6 |
| 92 | 37 | Quit | |

Compiled Listing:
W1, A5, D5, B200, M750, I16, 16, 11, 01, 1, W7, 02, 2, W20, 02, 0, W8, 01, 0, N600, +G016, 16, W1, 016, 0, I1, 1, 46, I2, 0, 80, L5, 15, 01, 1, W7, 02, 2, W2 0, 02, 0, W8, 01, 0, N600, +G08, 8, I4, 4, 83, 08, 0, R, 11, Q

PROGRAM #0 (OPERATIONAL DETAIL)

| LINE # | COMMAND | VALUE | DESCRIPTION |
|---|---|---|---|
| 1 | WAIT | 1 | WAIT 1/30TH OF A SECOND |
| 2 | ACCELERATION | 5 | SET ACCELERATION SLOPE OF FILM DRIVE MOTOR |
| 3 | DECELERATION | 5 | SET DECELERATION SLOPE OF FILM DRIVE MOTOR |
| 4 | BASE SPEED | 200 | SPEED AT WHICH MOTOR STOPS AND STARTS |
| 5 | MAX SPEED | 750 | SETS MAXIMUM SPEED OF MOTOR |
| 6 | *IF | 16, 16, 16 | START BUTTON, IF BUTTON PUSHED CONTINUE PROGRAM |
| 7 | **OUTPUT | 1, 1 | PLATEN ON |
| 8 | WAIT | 7 | .21 SECOND DELAY TO ASSURE PLATEN IS DOWN BEFORE EXPOSURE LAMPS ARE ON |
| 9 | **OUTPUT | 2, 2 | EXPOSURE LAMPS ON |
| 10 | WAIT | 20 | KEEPS EXPOSURE LAMPS ON FOR .66 SECONDS |
| 11 | **OUTPUT | 2, 0 | EXPOSURE LAMPS OFF |
| 12 | WAIT | 8 | .24 SECOND DELAY BEFORE PLATEN OFF |
| 13 | **OUTPUT | 1, 0 | PLATEN OFF |
| 14 | ***NUMBER | 600 | STEPS PER FILM ADVANCE |
| 15 | + PLUS | | SET CLOCKWISE DIRECTION OF FILM ADVANCE MOTOR |
| 16 | GO | | BEGIN MOTION |
| 17 | **OUTPUT | 16, 16 | STARTS PROGRAM AXIS #1 (CARRIAGE DRIVE) |
| 18 | WAIT | 1 | DELAY TO ASSURE AXIS 1 PROGRAM HAS STARTED |
| 19 | OUTPUT | 16, 0 | RESET START PROGRAM AXIS #1 |
| 20 | *IF | 1, 1, 20 | IF CARRIAGE COMPLETED ITS MOVE, CONTINUE PROGRAM |
| 21 | *IF | 2, 0, 33 | IF LAMP SWITCH IS IN THE ON POSITION, GO TO LINE #33 |
| 22 | LOOP | 5, 7 | LOOP BACK 5 TIMES TO LINE #7 |
| 23 | **OUTPUT | 1, 1 | PLATEN ON |
| 24 | WAIT | 7 | .21 SECOND DELAY TO ASSURE PLATEN DOWN BEFORE EXPOSURE LAMPS ON |
| 25 | **OUTPUT | 2, 2 | EXPOSURE LAMPS OFF |
| 26 | WAIT | 20 | EXPOSURE LAMPS ON FOR .66 SECONDS |
| 27 | **OUTPUT | 2, 0 | EXPOSURE LAMPS OFF |
| 28 | WAIT | 8 | .24 SECOND DELAY BEFORE PLATEN OFF |
| 29 | **OUTPUT | 1, 0 | PLATEN OFF |
| 30 | ***NUMBER | 600 | STEPS PER FILM ADVANCE |
| 31 | + PLUS | | SET CLOCKWISE DIRECTION OF FILM ADVANCE MOTOR |
| 32 | GO | | BEGIN MOTION |
| 33 | **OUTPUT | 8, 8 | SIGNAL AXIS #1 (CARRIAGE) TO RETURN HOME |
| 34 | *IF | 4, 4, 34 | IF CARRIAGE MOVING HOME, CONTINUE PROGRAM |
| 35 | **OUTPUT | 8, 0 | RESET CARRIAGE HOME SIGNAL |
| 36 | RUN | 6 | RETURN PROGRAM TO LINE #6 |

PROGRAM #0 (OPERATIONAL DETAIL)

| LINE # | COMMAND | VALUE | DESCRIPTION |
|---|---|---|---|
| 37 | QUIT | | END PROGRAM |

PROGRAM #1
Stored program length is 72 bytes

| | | | | |
|---|---|---|---|---|
| 0 | 1 | Wait | 1 | 24X AXIS #1 |
| 2 | 2 | Zero | 0 | |
| 3 | 3 | Acceleration | 20 | |
| 5 | 4 | Deceleration | 10 | |
| 7 | 5 | Bas speed | 500 | |
| 10 | 6 | Max sped | 6000 | |
| 13 | 7 | Output | 4, 0 | |
| 16 | 8 | If | 16, 0, 11 | |
| 20 | 9 | If | 8, 0, 19 | |
| 24 | 10 | Run | 8 | |
| 26 | 11 | Number | 3924 | |
| 29 | 12 | + Plus | | |
| 30 | 13 | Go | | |
| 31 | 14 | Wait | 10 | |
| 33 | 15 | Output | 1, 1 | |
| 36 | 16 | Wait | 30 | |
| 38 | 17 | Output | 1, 0 | |
| 41 | 18 | Run | 7 | |
| 43 | 19 | Output | 4, 4 | |
| 46 | 20 | Wait | 10 | |
| 48 | 21 | Acceleration | 20 | |
| 50 | 22 | Deceleration | 10 | |
| 52 | 23 | Base speed | 500 | |
| 55 | 24 | Max speed | 6000 | |
| 58 | 25 | Position | 0 | |
| 60 | 26 | Go | | |
| 61 | 27 | Output | 1, 1 | |
| 64 | 28 | Wait | 30 | |
| 66 | 29 | Output | 1, 0 | |
| 69 | 30 | Run | 1 | |
| 71 | 31 | Quit | | |

Compiled Listing:
W1, Z0, A20, D10, B500, M6000, 04, I16, 0, 26, I8, 0, 43, R16, N3924, +GW10, 01, 1, W30, , 01, 0, R13, 04, 4, W10, A20, D10, B500, M6000, P0 G01, 1, W30, 01, 0, R0, Q

PROGRAM #1 (OPERATIONAL DETAIL)

| LINE # | COMMAND | VALUE | DESCRIPTION |
|---|---|---|---|
| 1 | WAIT | 1 | WAIT 1/30TH OF A SECOND |
| 2 | ZERO | 0 | REFERENCE FOR THE POSITION REGISTER |
| 3 | ACCELERATION | 20 | SET ACCELERATION SLOPE OF CARRIAGE MOTOR |
| 4 | DECELERATION | 10 | SET DECELERATION SLOPE OF CARRIAGE MOTOR |
| 5 | BASE SPEED | 500 | SPEED AT WHICH MOTOR STOPS AND STOPS |
| 6 | MAX SPEED | 6000 | SETS MAXIMUM SPEED OF MOTOR |
| 7 | **OUTPUT | 4, 0 | INHIBITS PROGRAM #0 FROM RETURNING HOME |
| 8 | *IF | 16, 0, 11 | IF PROGRAM #0 HAS EXECUTED GO TO LINE #11 |
| 9 | *IF | 8, 0, 19 | IF PROGRAM #0 HAS COMPLETED GO TO LINE #19 |
| 10 | RUN | 8 | RETURN PROGRAM TO LINE #8 |
| 11 | ***NUMBER | 3924 | STEPS PER CARRIAGE ADVANCE |
| 12 | + PLUS | | SET CLOCKWISE DIRECTION OF CARIAGE MOTOR |
| 13 | GO | | BEGIN MOTION |
| 14 | WAIT | 10 | .33 SECOND DELAY |
| 15 | **OUTPUT | 1, 1 | START AXIS #0 AT LINE #23 |
| 16 | WAIT | 30 | WAIT 1 SECOND |
| 17 | **OUTPUT | 1, 0 | RESET OUTPUT #1 |
| 18 | RUN | 7 | RETURN PROGRAM TO LINE #7 |
| 19 | **OUTPUT | 4, 4 | NOTIFY PROGRAM #0 THAT THE CARRIAGE IS RETURNING HOME |
| 20 | WAIT | 10 | .33 SECOND DELAY |
| 21 | ACCELERATION | 20 | SET ACCELERATION SLOPE OF CARRIAGE RETURN |
| 22 | DECELERATION | 10 | SET DECELERATION SLOPE OF CARRIAGE RETURN |
| 23 | BASE SPEED | 500 | SPEED AT WHICH MOTOR STOPS AND STARTS |
| 24 | MAX SPEED | 6000 | SETS MAXIMUM SPEED OF MOTOR |
| 25 | POSITION | 0 | SETS MOTOR TO STARING POSITION (RETURN) |
| 26 | GO | | BEGIN MOTION |
| 27 | **OUTPUT | 1, 1 | NOTIFY PROGRAM #0 THAT PROGRAM #1 IS COMPLETE |
| 28 | WAIT | 30 | 1 SECOND DELAY |
| 29 | **OUTPUT | 1, 0 | RESET OUTPUT #1 |
| 30 | RUN | 1 | RUN PROGRAM TO LINE #1 |

-continued

| PROGRAM #1 (OPERATIONAL DETAIL) | | | |
|---|---|---|---|
| LINE # | COMMAND | VALUE | DESCRIPTION |
| 31 | QUIT | | END PROGRAM |

*This command reads, "if the input pins, as defined by the mask X1, are equal to X2, then go to program location Y".
**Sets the programmable outputs associated with each axis and selected by the mask X1 to the data pattern corresponding to the binary-weighted number specified by X2.
***Number of steps to be moved for the go command.

As noted in the above programs, the different axes must be able to communicate with each other. This is done through the inputs and outputs of the indexer. Being that the indexer drivers can only supply 150 mA each, an external driver board, as shown in FIG. 9, must be incorporated. Both the platen and exposure lamp circuits use only one driver each, because of the polarity of the indexer (normally high). The brake circuit requires the back to back drivers due to the fact that the brake is on when no power is applied. The brakes stay in the off state until the platen is energized via output #1 in program #0. The brakes remain on through the exposure cycle and platen off. This keeps the film from moving and causing blurs. The platen is controlled by output #1, and the exposure lamps are controlled by output #2, both in program #0.

The exposure control is designed to supply a variable voltage to the lamp bank that will not be affected by changes is line voltage.

The exposure control is made up of three (3) basic circuits:

1) VOLTAGE REGULATOR—the input voltage (120 vac 60 hz) is changed to 154 vdc by a full wave rectifier (CR1) and filter capacitor (C1). Voltage regulator (VR1) and transistor (Q1) senses changes in line voltage and compensates accordingly. Front panel mount 10K ohm 10 turn potentiometer (R3) sets the exposure voltage. This voltage is determined by the density of the original voltage. This voltage is determined by the density of the original fiche card. Multi-turn potentiometers (R2 and R4) set the upper and lower limits of the exposure voltage available;

2) LAMP TRIGGER—the purpose of this circuit is to supply a means for turning the lamp bank on and off as dictated by the indexer. Transistor (Q2) is in series with the lamp bank. Q2 is held in a turned off state by photo transistor Q3. Q3 is used as an opto-isolator by being mechanically linked to an LED (CR2). When the exposure output of the indexer goes low CR2 turns on. CR2 turning on in turns, turns on Q3 which turns on Q2. When Q2 turns on the lamp bank illuminates; and 3) METER LOAD—this circuit simply maintains a load for the meter allowing the meter to show the exposure voltage even when the lamp bank is not on.

The film tension control is provided by the film take-up and supply spindles being controlled by motors 34 and 38. The supply motor moves in a counterclockwise direction, and the take-up motor in a clockwise direction. With the spindles moving in opposite directions, a constant tension can be kept on the film. If constant tension is not maintained, the duplicating film may blur and/or skew the image.

The circuitry is the same for both motors, the only difference being the actual wiring of the motors. It is in the wiring that we control motor direction. The motors turn on via TR1 and TR2. The turn on voltage is controlled by the 10 turn 100K ohm potentiometers R1 and R4, and the diacs D1 and D2. The diacs require the motor voltage to be at least 68 vac. R1, R2, R3, R5 and R6 are load dropping resistors.

We claim:

1. A microfiche to microfilm reformatting apparatus, comprising;
   means for advancing a length of microfilm to and from an exposure station;
   means for holding microfiche;
   means for positioning an image of at least one frame of said microfiche at said exposure station; and
   light exposure means for photographically exposing said microfiche image onto said microfilm.

2. An apparatus according to claim 1, wherein said microfiche positioning means comprises a moveable stage along two perpendicular axes.

3. An apparatus according to claim 2, wherein said holding means for said microfiche is associated with said moveable stage.

4. An apparatus according to claim 3, wherein said holding means comprises a glass plate.

5. An apparatus according to claim 2, including an automatic control connected to one or more actuators for controlling the movement of the moveable stage.

6. An apparatus according to claim 5, including means for programming and storing a program for controlling the movement of said stage.

7. An apparatus according to claim 1, wherein said microfilm advancing means comprises a storage reel for unexposed microfilm and a take-up reel for exposed microfilm.

8. An apparatus according to claim 7, including means for maintaining said microfilm under tension between said storage reel and said take-up reel.

9. An apparatus according to claim 8, wherein said tension means is defined by driving said take-up reel while braking said supply reel.

10. An apparatus according to claim 1, including a moveable platen for moving said microfilm into intimate contact with said microfilm prior to light exposing the image carried on said microfiche onto said microfilm.

11. A microfiche to microfilm reformatting apparatus, comprising;
   a support;
   a supply reel for microfilm rotatably supported on said support;
   a take-up reel for the microfilm rotatably supported on said support;
   a moveable stage mounted on said support for movement in two perpendicular directions for supporting and aligning one or more frames of microfiche with the microfilm;
   a moveable platen mounted on said support for moving and holding the microfilm in a position for exposing a microfiche image onto the microfilm; and
   a light source mounted on said support for exposing the microfiche image onto the microfilm.

12. An apparatus according to claim 11, wherein said moveable platen is positioned adjacent to said stage for moving a section of microfilm into intimate contact with at least a portion of the microfiche during an exposure operation.

13. An apparatus according to claim 1, including a first electric motor driving said supply, and a second electric motor driving said take-up reel.

14. A microfiche coping apparatus, comprising;
means for reformatting microfiche to microfilm; and
means for copying the microfilm onto a substrate.

15. An apparatus according to claim 14, wherein said reformatting means comprises:
means for advancing a length of microfilm to and from an exposure station;
means for holding microfiche;
means for positioning an image of at least one frame of said microfiche at said exposure station; and
means for photographically exposing said microfiche image onto said microfilm.

16. A process of reformatting microfiche to microfilm; comprising the step of:
photographing one or more individual frames of microfiche onto microfilm.

17. A process of copying microfiche, comprising the steps of:
photographing microfiche onto microfilm; and
copying the microfilm onto a substrate.

* * * * *